United States Patent
Good

(10) Patent No.: US 7,840,665 B1
(45) Date of Patent: Nov. 23, 2010

(54) SYSTEMS AND METHODS FOR PROVIDING AUTOMATED NETWORK MANAGEMENT

(75) Inventor: Gordon Scott Good, Sunnyvale, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1028 days.

(21) Appl. No.: 11/607,280

(22) Filed: Nov. 30, 2006

Related U.S. Application Data

(60) Provisional application No. 60/741,712, filed on Dec. 1, 2005.

(51) Int. Cl.
*G06F 15/173* (2006.01)
(52) U.S. Cl. ..................................... 709/224
(58) Field of Classification Search .................. 709/224
See application file for complete search history.

(56) References Cited

U.S. PATENT DOCUMENTS

| | | | | |
|---|---|---|---|---|
| 6,578,199 | B1 * | 6/2003 | Tsou et al. | 717/178 |
| 2002/0095571 | A1 * | 7/2002 | Bradee | 713/164 |
| 2002/0107809 | A1 * | 8/2002 | Biddle et al. | 705/59 |
| 2002/0188643 | A1 * | 12/2002 | Kennedy | 709/1 |
| 2004/0255167 | A1 * | 12/2004 | Knight | 713/201 |
| 2006/0161444 | A1 * | 7/2006 | Lubrecht et al. | 705/1 |
| 2007/0124803 | A1 * | 5/2007 | Taraz | 726/4 |

* cited by examiner

*Primary Examiner*—Krisna Lim

(57) ABSTRACT

A system and method for providing automated network management is provided. At least one network is monitored for one or more assets. At least one unmanaged asset is identified from the one or more assets. One or more access protocols associated with the at least one unmanaged asset are determined. The at least one unmanaged asset is accessed based on the one or more access protocols. At least one compliance policy is automatically applied to the at least one unmanaged asset.

20 Claims, 5 Drawing Sheets

SYSTEMS AND METHODS FOR PROVIDING AUTOMATED NETWORK MANAGEMENT

CROSS-REFERENCE TO RELATED APPLICATIONS

The present application claims the benefit and priority of U.S. provisional patent application Ser. No. 60/741,712 filed on Dec. 1, 2005 and entitled "Method and System for Network Management," which is herein incorporated by reference.

BACKGROUND OF THE INVENTION

1. Field of the Invention

The present invention relates generally to network devices, and more particularly to systems and methods for providing automated network management.

2. Description of Related Art

Conventionally, information technology (IT) organizations must comply with internal and external standards for configuration and management of IT assets, such as network devices and server computers. Typically, the IT assets are manually identified via manual inspection, catalogued, and checked for compliance with policies related to the internal and external standards. The IT assets that are not in compliance with these policies can be brought into compliance, or otherwise made compliant, via an often labor-intensive process.

Because of the labor intensive process, software management applications are sometimes provided to manage the IT assets. However, these software management applications frequently ignore IT assets, networks, and systems that are not initially introduced to the software management applications. Accordingly, added IT assets, new networks, and new systems may not be managed via the software management applications.

SUMMARY OF THE INVENTION

A system and method for providing automated network management is provided. In a method according to one embodiment, at least one network is monitored for one or more assets. At least one unmanaged asset is identified from the one or more assets. One or more access protocols associated with the at least one unmanaged asset are determined. The at least one unmanaged asset is accessed based on the one or more access protocols. At least one compliance policy is automatically applied to the at least one unmanaged asset.

DETAILED DESCRIPTION

Figure 1:
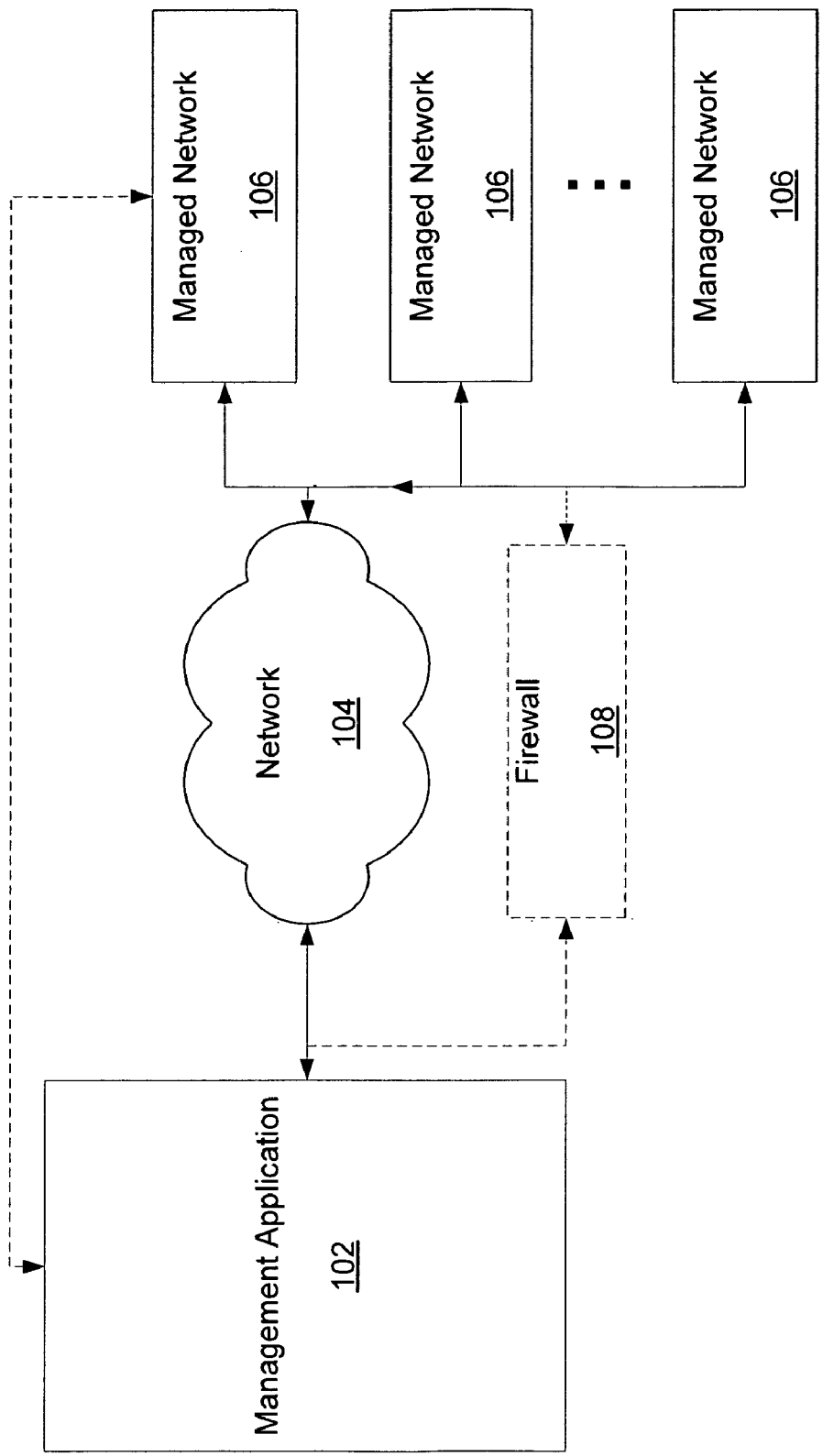
FIG. 1 illustrates an exemplary environment for providing automated network management.

FIG. 1 illustrates an exemplary environment for providing automated network management. A management application 102 communicates via a network 104 with one or more managed networks, such as managed networks 106 shown in FIG. 1. The management application 102 may communicate directly with the managed networks 106 according to some embodiments. According to some embodiments, a firewall 108 is provided between the management application 102 and the managed networks 106. A network tunnel (not shown) may also be provided to facilitate direct communication between the management application 102 and the managed networks 106.

The management application 102 may comprise any type of application for managing assets associated with the managed networks 106, such as information technology (IT) assets. The assets may include, for example, network devices (e.g., routers, switches, gateways,) servers, personal computers, and/or applications. According to some embodiments, an asset comprises an object. The management application 102 is automated, according to exemplary embodiments, for providing automatic identification and remediation of the assets being managed. Remediation may include, for example, bringing the assets into compliance with various compliance policies associated with the managed network 106, such as by configuring the assets according to the various compliance policies. According to alternative embodiments, each of the managed networks 106 includes the management application 102 for separate management of each of the managed networks 106.

The managed networks 106 comprise a network of one or more devices. For example, the assets and/or any other devices may be coupled to each of the managed networks 106. Each of the managed networks 106 may be assigned a network address, according to exemplary embodiments.

Figure 2:
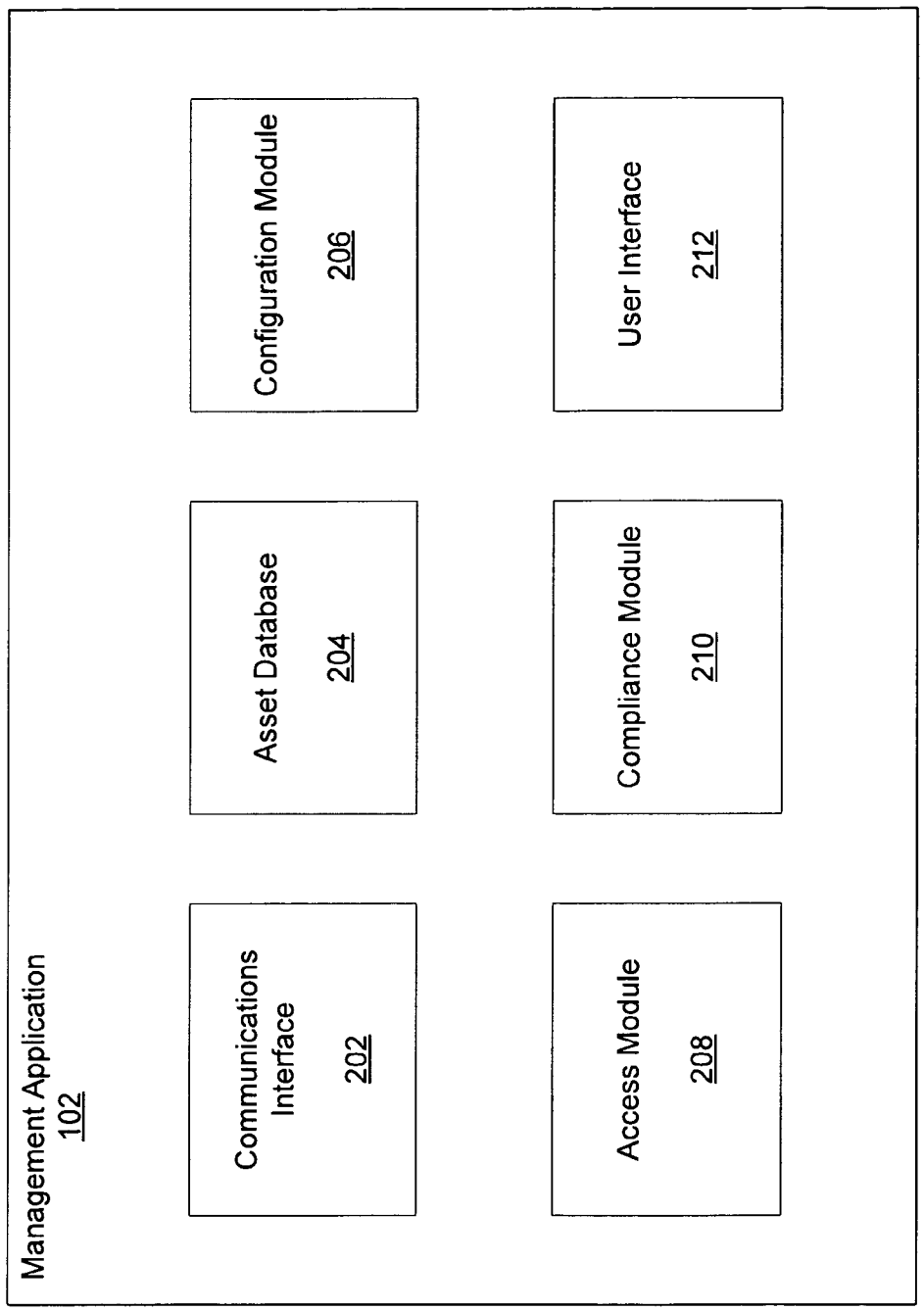
FIG. 2 illustrates a block diagram of an exemplary network management application.

Turning to FIG. 2, a block diagram of an exemplary management application, such as the management application 102 shown in FIG. 1, is illustrated. The management application 102 includes a communications interface 202. The communications interface 102 may be utilized to exchange communications between the management application 102 and the managed networks 106. As discussed herein, the communications may occur via the network 104 or directly. Further, the firewall 108 and/or the network tunnels (not shown) may also be utilized in an environment where communications are exchanged between the management application 102 and the communications interface 202.

The management application 102 may also comprise an asset database 204. The asset database 204 stores information about the assets, such as properties, access protocols, and so forth. The assets may comprise network devices, server computers, routers, and so forth. Any type of asset information may be stored by the asset database 204. The assets are discussed further in association with FIGS. 3 through 5.

A configuration module 206 is also provided via the management application 102. The configuration module 206 can track the configuration requirements associated with the assets, the configuration directives provided by a user, and so forth. Any type of configuration information may be provided by the configuration module 206. According to exemplary embodiments, configuration information for the assets is stored in the asset database 204.

An access module 208 is provided for accessing the assets. The access module 208 utilizes access protocols to gain access to the assets associated with the managed networks 106. For example, the access module 208 can log into a Microsoft Windows server using a NETBIOS protocol. The access module 208 can coordinate with the configuration module 206 to attempt to gain access to the assets utilizing the protocol information as well as the configuration information. The protocol information may be stored in the asset database 204.

A compliance module 210 provides compliance policies for the assets. The compliance module 210 may utilize information from the configuration module 206 and from the access module 208 to determine compliance policies to apply to the assets. The compliance policies may be stored in the asset database 204.

Although the asset database 204 may store information associated with the assets, the configuration, the access protocols, and/or the compliance policies, any other databases or storage mediums may be provided for storing any information associated with the management application 102, the managed networks 106, and/or the assets.

A user interface 212 is provided for allowing the user to input information, such as the scanning schedule, network addresses for the managed networks 106 to be scanned, and so forth. The user can enter instructions via the assets, such as a personal digital assistant, a laptop or desktop computer, a cellular telephone, and so forth according to some embodiments. According to some embodiments, the user can enter the instructions into a device directly associated with the management application 102, such as a server. The user can also specify the compliance policies, access protocols, and so forth via the user interface 212 or any other interface. As discussed herein, the user can specify a different monitoring schedule for each of the managed networks 106.

Although various modules are shown in FIG. 2 in association with the management application 102 (the communications interface 102, the asset database 204, the configuration module 206, the access module 208, the compliance module 210, and the user interface 212), fewer or more modules may comprise the management application 102 and still fall within the scope of various embodiments.

Figure 3:
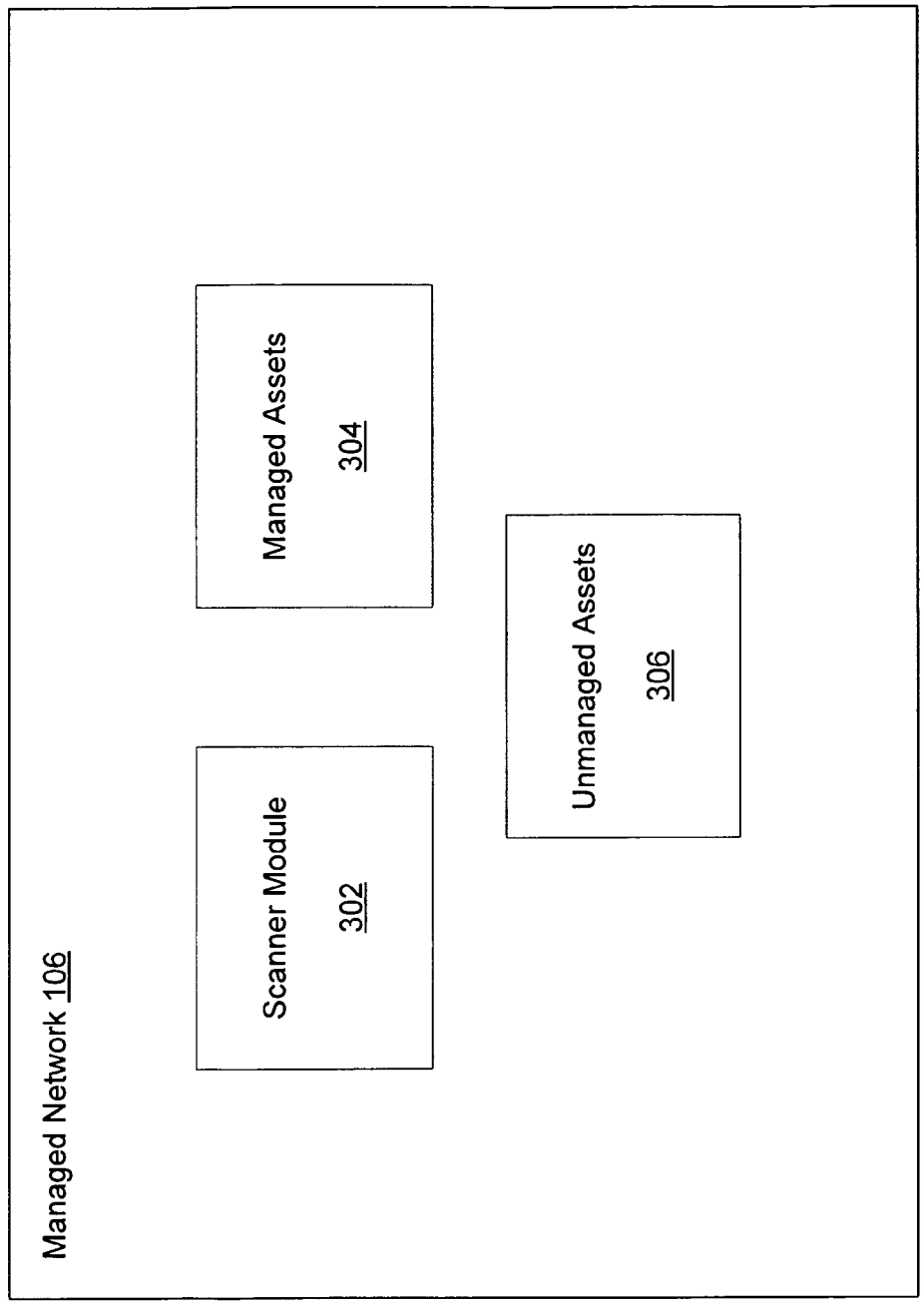
FIG. 3 illustrates a block diagram of an exemplary managed network environment.

FIG. 3 illustrates a block diagram of an exemplary managed network, such as the managed networks 106 in FIG. 1. A scanner module 302 comprises the managed network 106 for monitoring the managed network 106. The scanner module 302 may comprise a device within the managed network 106 assigned to scan or monitor the managed network 106, according to some embodiments. The scanner module 302 can search the managed network 106 periodically for the assets. Alternatively, the scanner module 302 may be included with the management application 102 for scanning the managed networks 106. The management application 102 can then, in an alternative embodiment, monitor each of the managed networks 106.

The scanner module 302 can perform the monitoring of the managed network according to a schedule provided by a user. Each of the managed networks 106 may be monitored according to a different schedule.

According to exemplary embodiments, the user defines a range of the managed networks 106 for which the monitoring should be performed. For example, the user can provide specific network addresses associated with each of the managed networks 106. Only the managed networks 106 with the network addresses specified by the user are then scanned or monitored.

Managed assets 304 and/or unmanaged assets 306 may comprise each of the managed networks 106. The managed assets 304 and the unmanaged assets 306 comprise devices, such as network devices, server computers, routers, switches, and so forth associated with the managed network 106. The managed assets 304 may comply with policies set forth by the management application 102, and thus may not necessarily require remediation.

The unmanaged assets 306 are typically not yet managed by the management application 102. Accordingly, the unmanaged assets 306 may not be configured according to the compliance policies associated with the compliance module 210, discussed herein. Accordingly, when the scanner module 302 detects the managed assets 304 and the unmanaged assets 306, the unmanaged assets 306 are identified as requiring remediation. In other words, when the scanner module 302 recognizes the unmanaged assets 306, the management application 102 provides instructions via the compliance module 210 to ensure that the unmanaged assets 306 accord with the compliance policies.

In order to access the unmanaged assets 306, the scanner module 302 searches the unmanaged assets 306 for information that allows the unmanaged assets 306 to be accessed. The information related to accessing the unmanaged assets 306 may be revealed when the scanner module 302 automatically further scans the unmanaged assets 306 for hardware, software, properties, and so forth following identification of the unmanaged assets 306.

According to other embodiments, the unmanaged assets 306 are accessed utilizing protocols known to allow access to a type of the unmanaged assets 306, for example. Login credentials for the unmanaged assets 306 may be provided by a user, according to some embodiments. The process for automatically managing the managed networks 106 and the unmanaged assets 306 associated with the managed networks 106 is discussed further in association with FIGS. 4 and 5.

Monitoring the managed networks 106 and scanning the managed networks 106 may comprise the same or similar steps. Alternatively, the monitoring may comprise observing the managed networks 106 and receiving an alert when the unmanaged asset 306 is added to the managed network 106. According to this alternative embodiment, the unmanaged asset 306 is identified and processed for compliance following the alert.

Although the exemplary managed network 106 is described as comprising various components, such as the scanner module 302, the managed assets 304, and the unmanaged assets 306, the managed network 106 may comprise fewer or more components and still fall within the scope of various embodiments.

Figure 4:
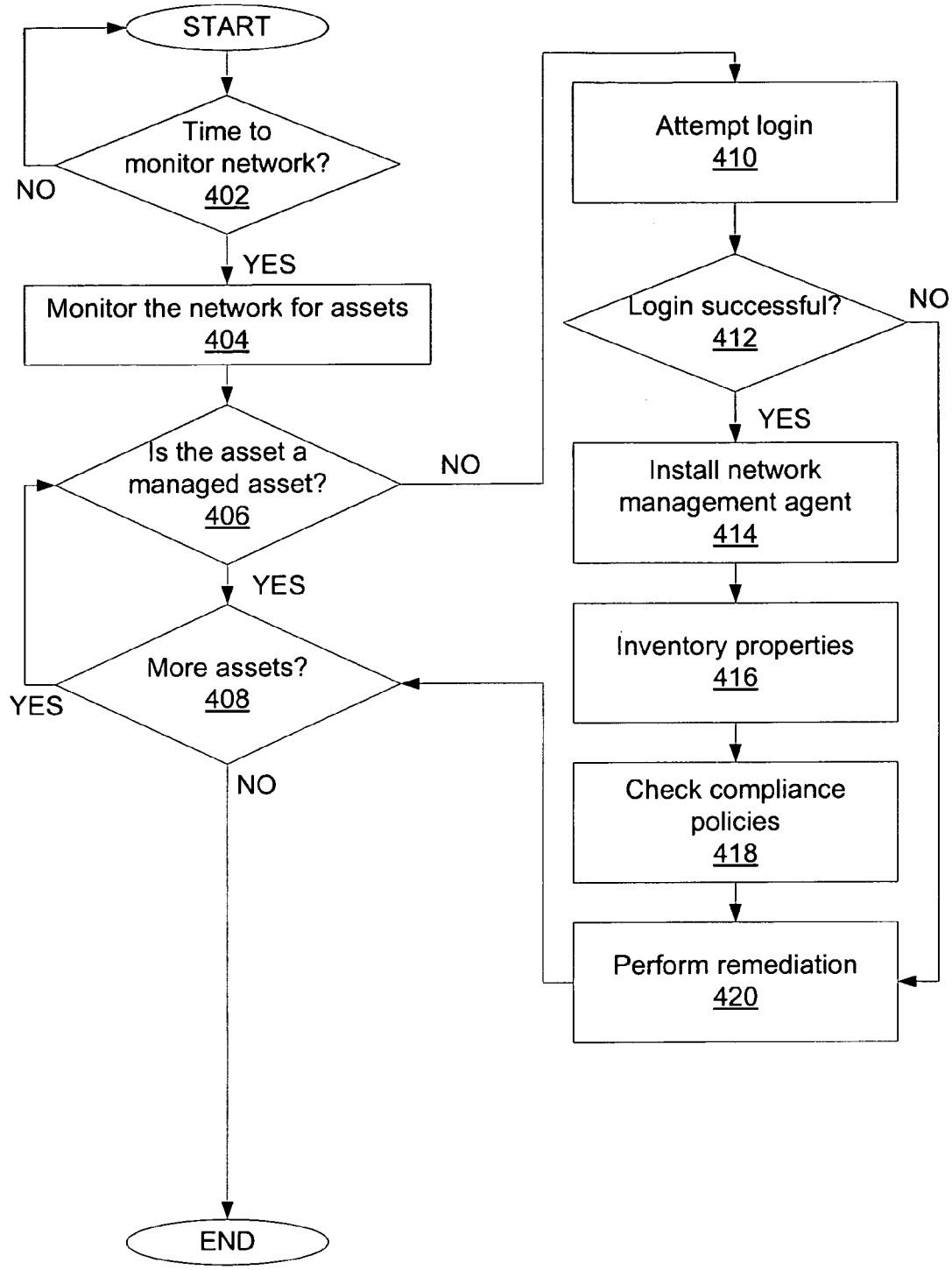
FIG. 4 illustrates a flow diagram of an exemplary process for scanning a managed network.

FIG. 4 illustrates a flow diagram of an exemplary process for scanning a managed network. At step 402, it is determined whether it is time to monitor the managed network 106. As discussed herein, the managed network 106, itself, may determine whether it is time to monitor the managed network 106, the management application 102 can make the determination, or any other device or application can determine whether it is time to monitor the managed network 106. The determination to monitor the managed network 106 may be made based on the schedule entered by the user, as discussed herein. Further, the particular managed networks 106 to be monitored may be determined based on input from the user, such as a list of network addresses, a range of network addresses, and so forth. If it is not yet time to monitor the network, the process may continue to wait for a determination. In one example, a determination whether it is time to monitor the managed network 106 is made over predetermined intervals (e.g., every sixty seconds.)

If it is determined that it is time to monitor the managed network, the managed network 106 is monitored for the assets if it is time to be monitored in step 404. As discussed herein, monitoring may comprise scanning or searching each of the managed networks for unmanaged assets, such as the unmanaged assets 306 associated with the managed network 106 discussed herein. The scan may detect both the managed assets 304 and the unmanaged assets 306. The unmanaged assets 306 may need to be brought into compliance with compliance rules specified by the management application 102. The user may specify the compliance rules for different devices and/or for different users.

At step 406, it is determined whether the asset located during the monitoring is the managed asset 304 or the unmanaged asset 306. If the asset is the managed asset 304, the monitoring continues to search for the unmanaged asset 306, at step 408. The unmanaged asset 306 may comprise detection of a new user, detection of a new device, detection of a device that has not been updated according to recent compliance rules, and so forth. Any device or user may comprise the unmanaged asset 306.

At step 410, the access module 208 at the management application 102, or an access module (not shown) otherwise associated with the managed network 106, attempts to login to the unmanaged asset 306. For example, the access module 208 may utilize an access protocol for the unmanaged asset 306 and/or configuration information for the unmanaged asset 306 to attempt the login. According to exemplary embodiments, once the scanner module 302 identified the unmanaged asset 306, the scanner module 302 scans the unmanaged asset 306 for the configuration information, the access protocol, hardware, and/or software associated with the unmanaged asset 306.

At step 412, it is determined whether the login is successful. If the login is successful, or in other words access to the unmanaged asset 306 is accomplished, a network management agent is installed on the unmanaged asset 306 in step 414. The management agent inventories the unmanaged asset 306 for properties such as software or hardware associated with the unmanaged asset 306 at step 416.

At step 418, the compliance module 210 checks the compliance policies against the unmanaged asset 306. For example, the compliance module 210 may compare compliance policies specified by the user for the type of device comprising the unmanaged asset 306 with one or more rules associated with the unmanaged asset 306.

At step 420, the compliance module 210 performs remediation on the unmanaged asset 306. In other words, the compliance module 210 installs the necessary compliance policies on the unmanaged asset 306 so that the unmanaged asset 306 is in accord with the compliance policies. If the login is unsuccessful at step 412, the remediation at step 420 may comprise disconnecting the unmanaged asset 306 or disabling access to the managed network 106 for the unmanaged asset 306. Once the unmanaged asset 306 is remediated, or otherwise brought into compliance, at step 420, the unmanaged asset 306 may comprise a managed asset.

As discussed herein, the compliance policies may comprise instructions for installing one or more rules that accord with the compliance policies for the unmanaged asset 306. For example, the one or more rules may comprise software applications, a password, restrictions on access to the managed network 106, and so forth. Any type of compliance policies or rules associated with the compliance policies may be installed, updated, modified, and so forth on the unmanaged asset 306. If no additional unmanaged assets 306 are identified at step 408, the monitoring or scanning for that timeframe is complete.

Figure 5:
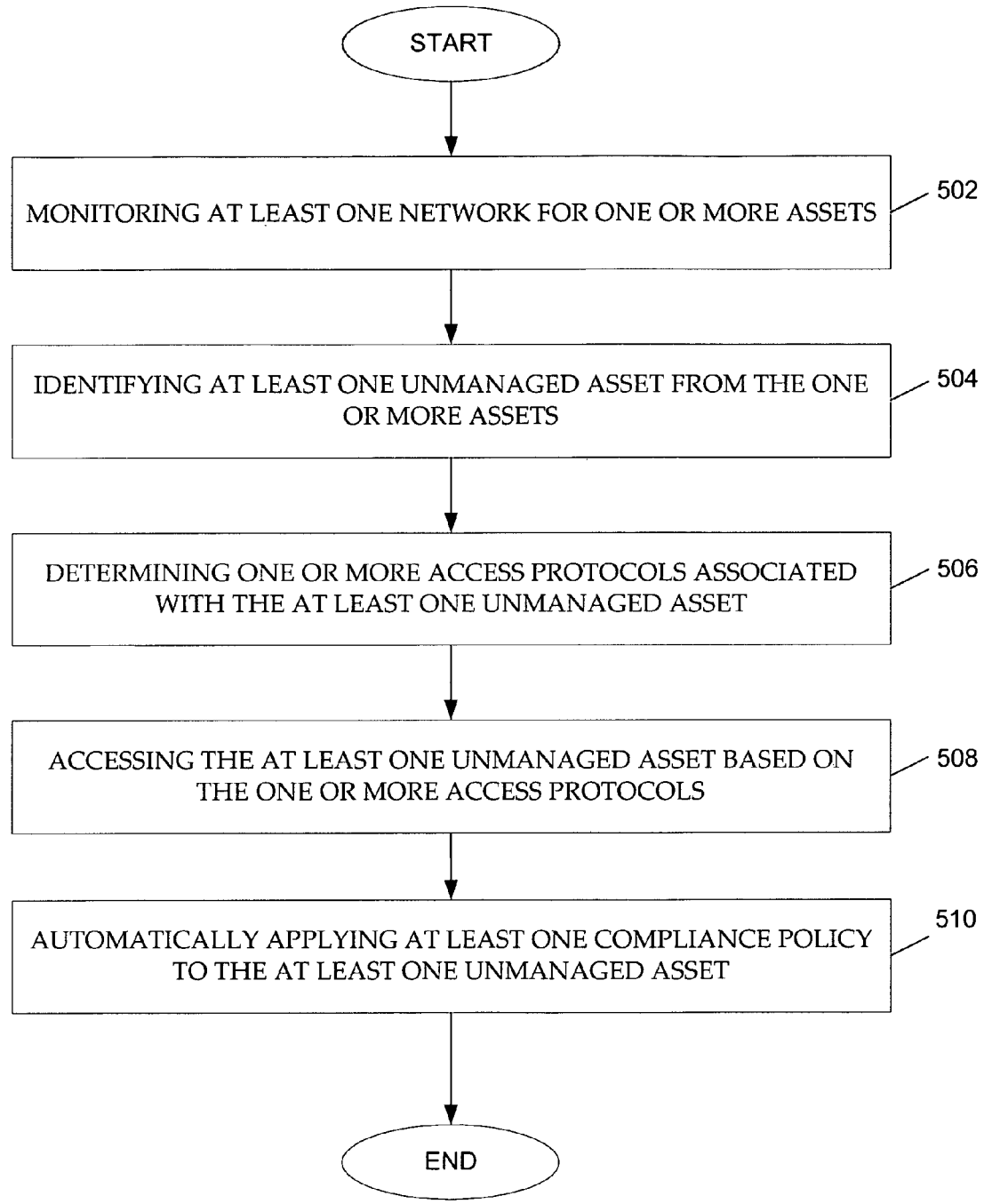
FIG. 5 illustrates a flow diagram of an exemplary process for providing automated network management.

Referring to FIG. 5, a flow diagram of an exemplary process for providing automated network management is illustrated. At step 502, at least one network is monitored for one or more assets. For example, the network may comprise the managed networks 106. As discussed herein, the managed networks 106 may comprise one or more networks including the one or more assets that include various devices, such as servers, laptop computers, desktop computers, routers, switches, personal digital assistants, cellular telephones, and so forth. One or more users can access the managed networks 106 via the various devices.

As discussed herein, the monitoring may be performed on the managed networks 106 specified by the user according to the network addresses, a range of network addresses, or any other information provided by the user. Further, the monitoring may be performed according to a schedule provided by the user, such as every hour, every 10 minutes, and so forth. Any type of schedule may be provided for the monitoring. According to alternative embodiments, the managed network 106 automatically monitors itself according to a default schedule, such as every day.

At step 504, at least one unmanaged asset is identified from the one or more assets. For example, the scanner module 302 may identify the unmanaged asset 306 discussed in FIG. 3. The unmanaged asset 306 may comprise any device or application associated with the managed network 106.

At step 506, one or more access protocols associated with the at least one unmanaged asset are determined. As discussed herein, the access module 208 can determine the access protocols associated with the unmanaged asset 306 that is identified via the monitoring. The access protocols may be based on policies that control which protocol to use when accessing the unmanaged assets 306 or on any other information. According to exemplary embodiments, the access protocols are determined based on information revealed when the at least one unmanaged asset is further examined, such as when the unmanaged asset 306 is further scanned for hardware, software, and/or any other information associated with the unmanaged asset 306.

The at least one unmanaged asset is accessed based on the one or more access protocols, at step 508. For example, the unmanaged asset 306 may be logged into, or otherwise accessed, based on the access protocol. As discussed herein, the access protocol may be provided by a user, determined from further scanning the unmanaged asset 306, itself, and so on.

At step 510, at least one compliance policy is automatically applied to the at least one unmanaged asset. The compliance policy may be applied based on one or more compliance policies provided by the user. As discussed herein, applying the compliance policy may comprise disabling access of the unmanaged asset 306 the managed network 106, installing applications on the unmanaged asset 306, installing acceptable values of one or more attributes associated with the unmanaged asset 306, or any other process directed towards according the unmanaged asset 306 with the compliance policies specified by the management application 102.

As discussed herein, once the unmanaged asset 306 is identified, the scanner module 302 can further scan the unmanaged asset 306 for properties or attributes associated with the unmanaged asset 306. The properties or the attributes may comprise access rules, protocols, and so forth. Based on the properties or the attributes, the compliance module 210 can determine what compliance policy or compliance policies to apply to the unmanaged asset 306 to bring the unmanaged asset 306 into compliance or accord with the compliance policies. For example, the user may specify the compliance policies, the compliance policies may be defaulted according to device type, the compliance policies may be specified according to user type, and so forth.

While various embodiments have been described above, it should be understood that they have been presented by way of example only, and not limitation. For example, any of the elements associated with the management application 102 may employ any of the desired functionality set forth herein above. Thus, the breadth and scope of a preferred embodiment should not be limited by any of the above-described exemplary embodiments.

What is claimed is:

1. A method for providing automated network management comprising:
   monitoring at least one network for one or more assets;
   identifying at last one unmanaged asset from the one or more assets, each unmanaged asset not yet being managed by a management application;
   determining one or more access protocols associated with the at least one unmanaged asset, each access protocol provides information usable for communication access to an associated unmanaged asset;
   accessing the at least one unmanaged asset based on the one or more access protocols; and
   automatically applying at least one compliance policy to the at least one unmanaged asset, wherein applying the at least one compliance policy includes installing the at least one compliance policy on the at least one unmanaged asset.

2. The method recited in claim 1, wherein monitoring is performed based on a schedule specified by a user.

3. The method recited in claim 1, wherein the at least one compliance policy is specified by the user.

4. The method recited in claim 1, further comprising identifying one or more properties associated with the at least one unmanaged asset.

5. The method recited in claim 4, further comprising storing the one or more properties.

6. The method recited in claim 4, further comprising selecting the at least one compliance policy based on the identified one or more properties.

7. The method recited in claim 4, wherein the at least one compliance policy includes instructions for installing one or more software applications.

8. The method recited in claim 1, wherein a user provides a set of network addresses for the monitoring.

9. The method recited in claim 1, wherein the compliance policy includes instructions for disconnecting the at least one unmanaged asset.

10. A system for providing automated network management comprising:
    a scanner module configured to monitor at least one network for one or more assets and to identify at least one unmanaged asset from the one or more assets, each unmanaged asset not yet being managed by a management application;
    a configuration module configured to determine one or more access protocols associated with the at least one unmanaged asset, each access protocol provides information usable for communication access to an associated unmanaged asset;
    an access module configured to access the at least one unmanaged asset based on the one or more access protocols; and
    a compliance module configured to automatically apply at least one compliance policy to the at least one unmanaged asset, wherein application of the at least one compliance policy includes installation of the at least one compliance policy on the at least one unmanaged asset.

11. The system recited in claim 10, wherein the scanner module monitors the at least one network based on a schedule specified by a user.

12. The system recited in claim 10, wherein the at least one compliance policy is specified by the user.

13. The system recited in claim 10, wherein the configuration module is further configured to identify one or more properties associated with the at least one unmanaged asset.

14. The system recited in claim 13, further comprising an asset database configured to store the one or more properties.

15. The system recited in claim 13, wherein the at least one compliance policy is applied based on the identified one or more properties.

16. The system recited in claim 13, wherein the at least one compliance policy includes instructions for installing one or more software applications.

17. The system recited in claim 10, further comprising a user interface configured to receive a set of network addresses for the monitoring.

18. The system recited in claim 10, wherein the compliance policy includes instructions for disconnecting the at least one unmanaged asset.

19. A non-transitory computer readable medium containing a computer program having instructions for providing automated network management, said program comprising:
    monitoring at least one network for one or more assets;
    identifying at least one unmanaged asset from the one or more assets, each unmanaged asset not yet being managed by a management application;
    determining one or more access protocols associated with the at least one unmanaged asset, each access protocol provides information usable for communication access to an associated unmanaged asset;
    accessing the at least one unmanaged asset based on the one or more access protocols; and
    automatically applying at least one compliance policy to the at least one unmanaged asset, wherein applying the at least one compliance policy includes installing the at least one compliance policy on the at least one unmanaged asset.

20. The non-transitory computer readable medium of claim 19, wherein the computer program further comprises instructions for identifying one or more properties associated with the at least one unmanaged asset.

* * * * *

UNITED STATES PATENT AND TRADEMARK OFFICE
CERTIFICATE OF CORRECTION

| | | |
|---|---|---|
| PATENT NO. | : 7,840,665 B1 | Page 1 of 1 |
| APPLICATION NO. | : 11/607280 | |
| DATED | : November 23, 2010 | |
| INVENTOR(S) | : Gordon Scott Good | |

It is certified that error appears in the above-identified patent and that said Letters Patent is hereby corrected as shown below:

In column 7, line 10, in Claim 1, delete "last" and insert -- least --, therefor.

Signed and Sealed this
Seventeenth Day of May, 2011

David J. Kappos
*Director of the United States Patent and Trademark Office*